United States Patent
Keppel et al.

(10) Patent No.: US 9,354,694 B2
(45) Date of Patent: *May 31, 2016

(54) CONTROLLING PROCESSOR CONSUMPTION USING ON-OFF KEYING HAVING A MAXIMUM OFF TIME

(71) Applicant: Intel Corporation, Santa Clara, CA (US)

(72) Inventors: David Pardo Keppel, Seattle, WA (US); Jawad Nasrullah, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 461 days.

This patent is subject to a terminal disclaimer.

(21) Appl. No.: 13/827,738

(22) Filed: Mar. 14, 2013

(65) Prior Publication Data

US 2014/0281602 A1  Sep. 18, 2014

(51) Int. Cl.
  *G06F 1/32* (2006.01)

(52) U.S. Cl.
  CPC .............. *G06F 1/3287* (2013.01); *G06F 1/324* (2013.01); *G06F 1/3296* (2013.01); *Y02B 60/1217* (2013.01); *Y02B 60/1282* (2013.01); *Y02B 60/1285* (2013.01)

(58) Field of Classification Search
  CPC ............................ G06F 1/3287; G06F 1/3237
  See application file for complete search history.

(56) References Cited

U.S. PATENT DOCUMENTS

| | | | |
|---|---|---|---|
| 5,983,355 A * | 11/1999 | Kenny et al. | 713/322 |
| 8,612,786 B1 * | 12/2013 | Lachwani et al. | 713/322 |
| 8,856,566 B1 * | 10/2014 | Jane | 713/320 |
| 8,924,752 B1 * | 12/2014 | Law et al. | 713/322 |
| 2005/0215227 A1 * | 9/2005 | Vu et al. | 455/343.2 |
| 2007/0260794 A1 * | 11/2007 | Ashish et al. | 710/267 |
| 2007/0288778 A1 | 12/2007 | Zhuang et al. | |
| 2009/0077401 A1 * | 3/2009 | Tsai | 713/320 |
| 2009/0150696 A1 * | 6/2009 | Song et al. | 713/323 |
| 2010/0082866 A1 * | 4/2010 | White et al. | 710/260 |
| 2010/0228955 A1 * | 9/2010 | Niggemeier et al. | 712/214 |
| 2011/0040995 A1 * | 2/2011 | Basak et al. | 713/324 |
| 2012/0166731 A1 * | 6/2012 | Maciocco et al. | 711/130 |
| 2012/0166838 A1 * | 6/2012 | Nasrullah et al. | 713/322 |
| 2012/0210104 A1 | 8/2012 | Danko | |
| 2013/0007492 A1 * | 1/2013 | Sokol et al. | 713/322 |
| 2013/0015904 A1 * | 1/2013 | Priel et al. | 327/419 |

(Continued)

FOREIGN PATENT DOCUMENTS

EP  2166457 A1  3/2010

OTHER PUBLICATIONS

U.S. Patent and Trademark Office, Reply filed on Aug. 10, 2015, in U.S. Appl. No. 13/894,642.

(Continued)

*Primary Examiner* — Jaweed A Abbaszadeh
*Assistant Examiner* — Gary Collins
(74) *Attorney, Agent, or Firm* — Trop, Pruner & Hu, P.C.

(57) ABSTRACT

In an embodiment, a processor includes a logic to cause at least one core to operate with a power control cycle including a plurality of on times and a plurality of off times according to an ON-OFF keying protocol, where the off times each correspond to a maximum off time for a platform including the processor. Other embodiments are described and claimed.

17 Claims, 11 Drawing Sheets

(56) References Cited

U.S. PATENT DOCUMENTS

| | | | |
|---|---|---|---|
| 2013/0061064 A1 | 3/2013 | Ananthakrishnan et al. | |
| 2013/0198549 A1* | 8/2013 | Longnecker et al. | 713/324 |
| 2014/0006817 A1* | 1/2014 | Bonen et al. | 713/320 |
| 2014/0189398 A1* | 7/2014 | Gorbatov et al. | 713/323 |
| 2014/0237276 A1* | 8/2014 | Machnicki et al. | 713/323 |
| 2014/0310540 A1* | 10/2014 | Herbeck | 713/320 |

OTHER PUBLICATIONS

European Patent Office, Extended Search Report mailed on May 11, 2015, in European Patent Application No. 14166867.3.

U.S. Patent and Trademark Office, Office Action mailed on May 11, 2015, in U.S. Appl. No. 13/894,642.

* cited by examiner

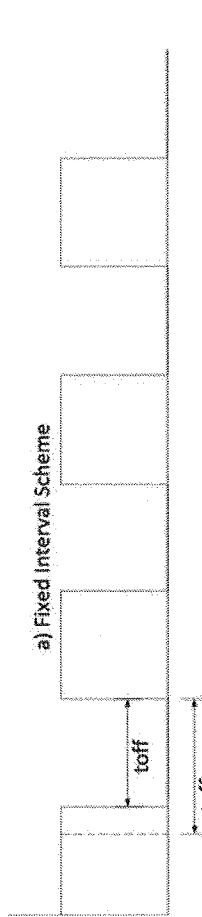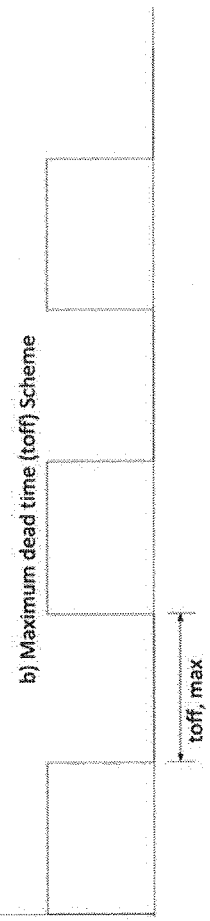
FIG. 3B
FIG. 3C

CONTROLLING PROCESSOR CONSUMPTION USING ON-OFF KEYING HAVING A MAXIMUM OFF TIME

TECHNICAL FIELD

Embodiments of the invention relate to systems and methods for energy efficiency and energy conservation including on-off keying for power control.

BACKGROUND

Power management techniques for computer systems and processors typically use dynamic voltage and frequency scaling. Reducing frequency allows reducing voltage, which improves efficiency. However, practical circuits have a minimum operating voltage, Vmin, and cannot operate below Vmin. At Vmin operation, typically there is also a most-efficient frequency, Fmin. Speed can be reduced below Fmin to reduce power, but speed drops faster than power, so efficiency suffers. Another technique includes software-generated requests for idle states, without direct control of voltage, other hardware parameters, and without a guarantee of the physical state that will result. The operating system is the software that generates the requests for idle states.

Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

BRIEF DESCRIPTION OF THE DRAWINGS

FIG. 3B is a graphical illustration of a first power control scheme.

FIG. 3C is a graphical illustration of a second power control scheme in accordance with an embodiment of the present invention.

DETAILED DESCRIPTION

In various embodiments, a processor may be controlled to operate with an ON-OFF keying protocol such that, within a broader active time of the processor, at least portions of the processor are periodically placed into one or more power saving states. That is, ON-OFF keying in accordance with an embodiment of the present invention provides a cycle time, which itself may be of a variable time period. Each cycle of the cycle time includes an on time and an off time. During the on time, the circuitry to be controlled, e.g., an entire processor, one or more cores thereof, or blocks of a core or other logic of a processor, is caused to be in an active state. Instead during an off time, the relevant circuitry is placed into a low power state in which no active work is performed. Such ON-OFF keying may be used in conjunction with other power management activities of a processor or a system, and as such this type of power control can be complementary to other types of power control of the processor or other computer system hardware.

Figure 1:
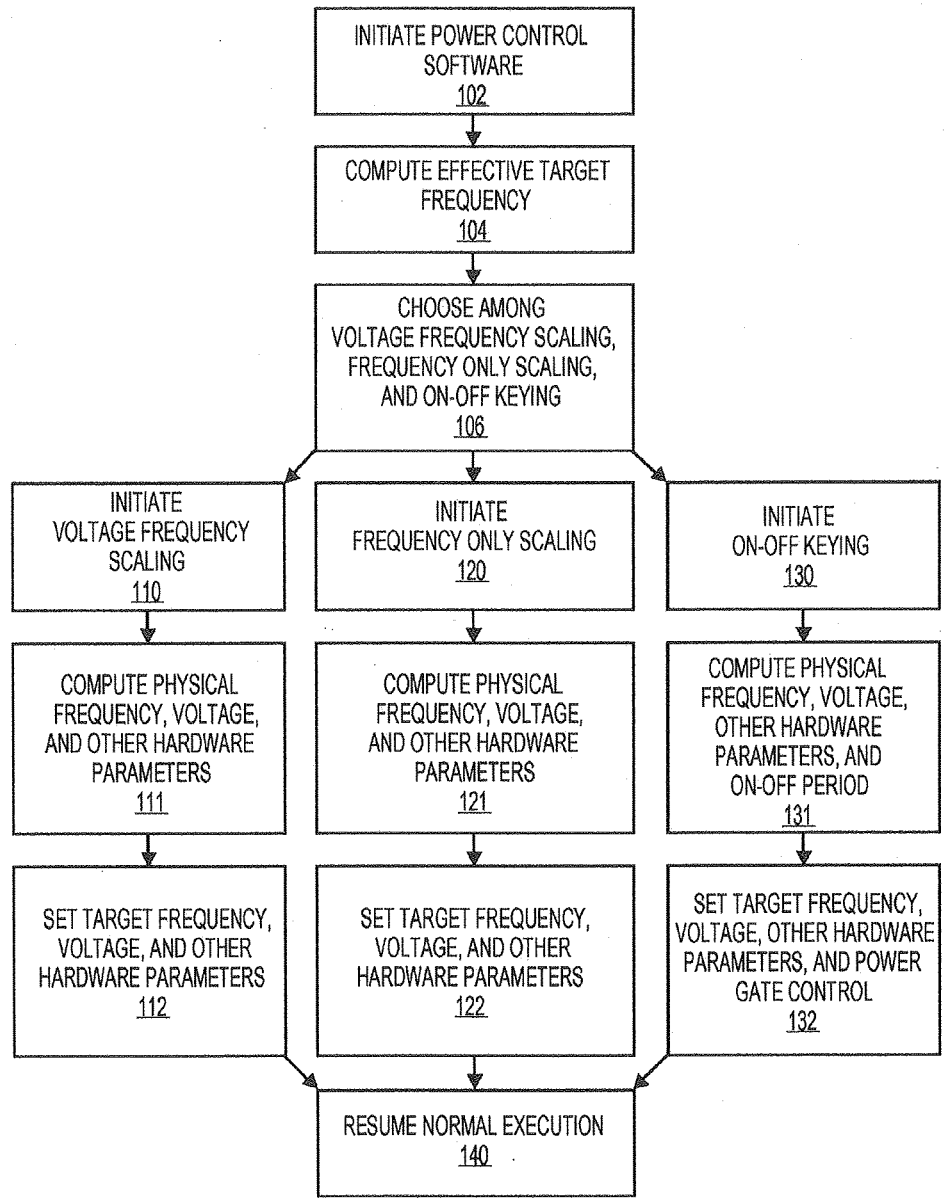
FIG. 1 illustrates a flow diagram of one embodiment for a computer-implemented method of controlling power of a device to reduce power consumption in accordance with one embodiment of the invention.

FIG. 1 illustrates a flow diagram of one embodiment for a computer-implemented method 100 of controlling power of a device to reduce power consumption in accordance with one embodiment. The method 100 is performed by processing logic that may comprise hardware (circuitry, dedicated logic, etc.), software (such as is run on a general purpose computer system or a dedicated machine or a device), or a combination of both. In one embodiment, the method 100 is performed by processing logic associated with the devices or systems discussed herein.

At block 102, the processing logic initiates or invokes power control using power control software to operate the device in an energy-efficient manner. For example, the power control software may be associated with or located on a processor core or microcontroller. The processing logic computes an effective target frequency for a device based on one or more inputs at block 104. For example, the one or more inputs may include environmental sensors, silicon age monitors, etc. The one or more inputs may include power and other hardware monitors, platform and external hardware (e.g., input/output (I/O) devices), workload monitor, idle monitor, and user input. A low power mode may limit the target frequency to a different (lower) target frequency than a normal power mode. At block 106, the processing logic selects a power control method among various different power control methods. For example, these methods may include voltage-frequency scaling, frequency-only scaling, and ON-OFF keying. One of these methods is selected based on at least one of voltage and frequency conditions, the effective target frequency, and inputs that have been received. Alternatively, a default power control method may be selected or predetermined. In one embodiment, for a Vmin condition, the ON-OFF keying method is selected or used as a default. The ON-OFF keying method for Vmin and possibly other operating conditions as well (e.g., voltages greater than Vmin for a cost sensitive design or power limited design) provides a reduced leakage power during the OFF condition. Thus, the ON-OFF keying method provides less power consumption and more energy-efficiency in comparison to other power control methods.

At block 130, the power control with the ON-OFF keying method is initiated based on its selection or default selection at block 106. At block 131, the processing logic computes physical frequency and supply voltage for the device, other hardware parameters, and an ON-OFF period for the ON-OFF keying. At block 132, the processing logic sets the target frequency and target supply voltage for the device, other hardware parameters, and power gate control based on the ON-OFF keying. The physical frequency and supply voltage of the device may be adjusted to the target frequency and target supply voltage for the device. In one embodiment, the target frequency and target supply voltage are set as a single point design with the ON-OFF keying. At block 140, the device resumes normal execution.

Alternatively, at block 110, the voltage-frequency scaling method is initiated based on its selection at block 106. At block 111, the processing logic computes physical frequency and voltage for the device and other hardware parameters. At block 112, the processing logic sets the target frequency and voltage for the device and other hardware parameters. At block 140, the device resumes normal execution.

Alternatively, at block 120, the frequency-only method is initiated based on its selection at block 106. At block 121, the processing logic computes physical frequency and voltage for the device and other hardware parameters. At block 122, the processing logic sets the target frequency and voltage for the device and other hardware parameters. At block 140, the device resumes normal execution.

Figure 2:
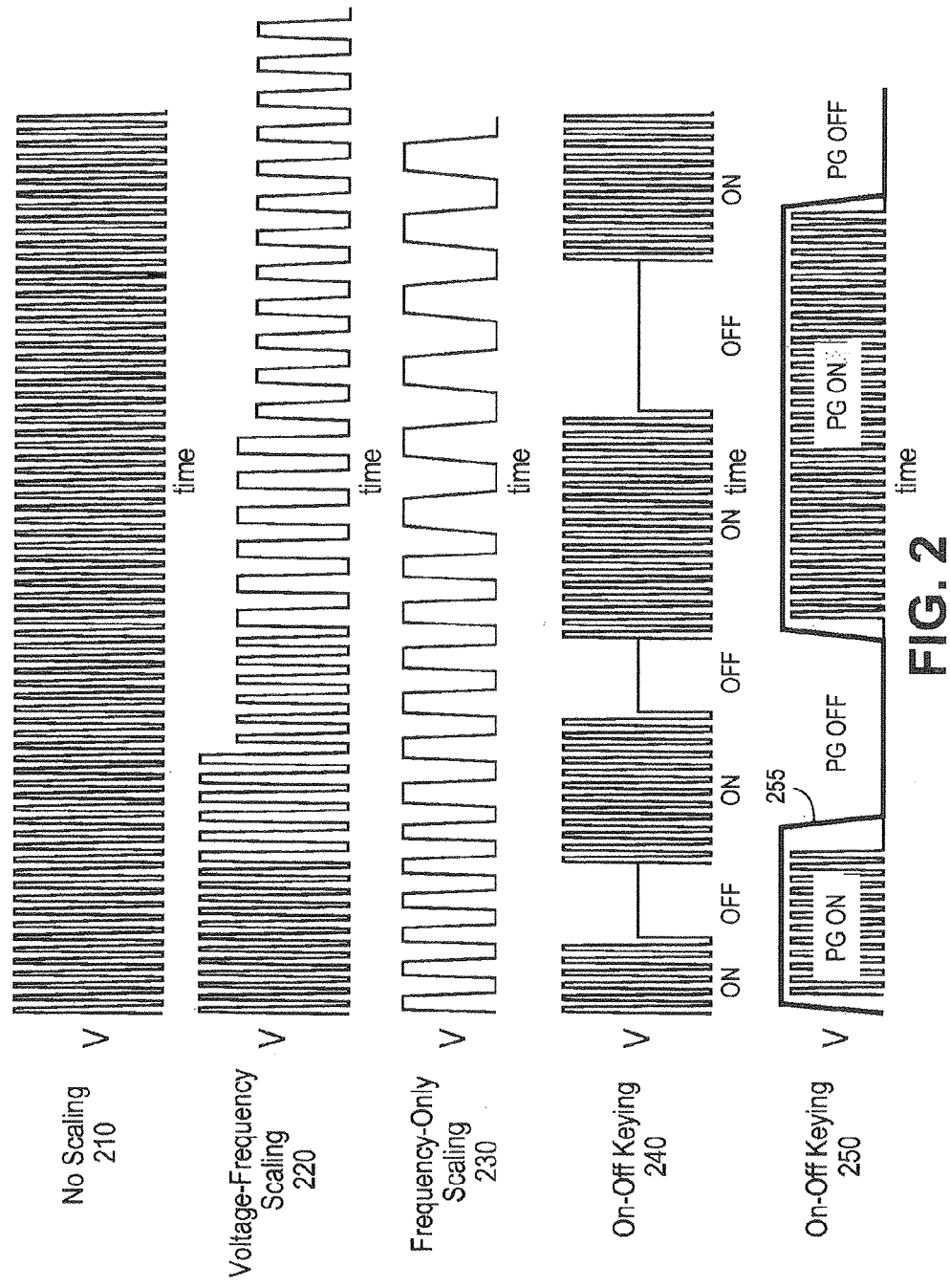
FIG. 2 illustrates exemplary power control waveforms associated with power control methods in accordance with one embodiment of the invention.

FIG. 2 illustrates exemplary power control waveforms associated with power control methods in accordance with one embodiment of the invention. The waveforms 210, 220, 230, 240, and 250 each represent voltage on a vertical axis and time on a horizontal axis. The waveform 210 provides no scaling and is provided as a reference waveform. The waveform 220 provides a voltage-frequency scaling method that scales both voltage and frequency. The waveform 230 provides a frequency-only scaling method that scales only frequency given a Vmin. The waveform 240 provides an ON-OFF keying method that modulates between ON and OFF. The waveform 250 provides another example of an ON-OFF keying method that shows power gate modulation between ON and OFF conditions as indicated by the waveform 255.

Figure 3A:
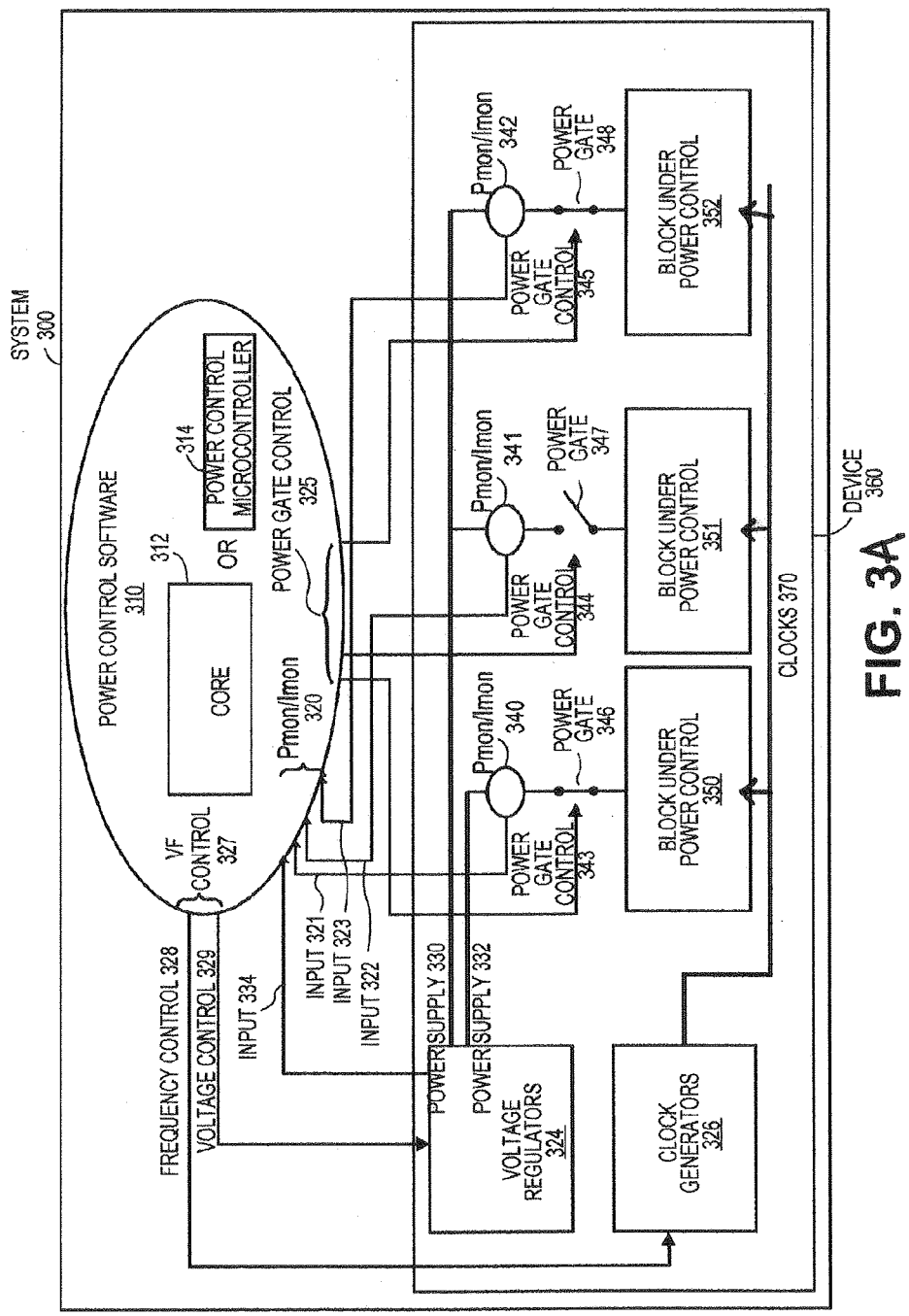
FIG. 3A illustrates a block diagram of a system having power control in accordance with one embodiment of the invention.

FIG. 3A illustrates a block diagram of a system 300 having power control in accordance with one embodiment of the invention. The system 300 includes power control software 310 that can be stored on or associated with a processor core 312 or a power control microcontroller 314. In an embodiment, microcontroller 314 is a power control unit (PCU) of a processor. For core 312, power control software 310 may be firmware that functions as an intermediate layer between a guest instruction set architecture (ISA) (e.g., x86 based instructions) and a host ISA. Alternatively, microcontroller 314 may store power control software 310. Power control software 310 receives one or more inputs 334 from voltage regulators 324 that are based on voltages of a power supply 330 and a power supply 332. A power or current monitor controller 320 receives inputs 321-323 from power or current monitors 340-342, respectively. The inputs 321-323 are used to determine whether power gates 346-348 are to be opened or closed. Power gate controller 325 generates outputs, namely power gate control signals 343-345, to control the position of power gates 346-348, respectively. A voltage frequency (VF) controller 327 generates outputs, namely a frequency control signal 328 and a voltage control signal 329, to control the frequency of clock generators 326 and voltage of voltage regulators 324, respectively. Clock signals 370 are provided to various blocks 350-352 of a device 360 that is under power control. In an embodiment, this device is a multicore processor that includes core 312, microcontroller 314 and a plurality of other processing engines such as multiple homogeneous or heterogeneous cores, graphics processing units, uncore circuitry and other logic. The voltage regulators 324 may also be located off-chip rather than on the device.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the ON-OFF keying protocol described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Rather than using frequency scaling to control circuit power, one or more blocks of a processor can be controlled to operate at a most efficient operating point (in terms of frequency, Fmin), and operate using ON-OFF keying. Such power control can be more efficient than frequency adjustment because an always-running circuit has leakage always, but ON-OFF operation can reduce or eliminate leakage power during the off time by removing power or placing circuits on a retention voltage.

One limit to ON-OFF efficiency is shut down and restart overheads, which consume energy but do not contribute to useful work during the on time. Examples of such overheads include voltage ramping; clock restart; and state used for circuit operation that is lost when power is removed and so must be saved and restored.

Using ON-OFF keying according to an embodiment of the present invention, overheads are minimized by performing the smallest number of on/off transitions during any given time interval. Theoretically the smallest number of on/off transitions is just one, but in practice processors are configured to satisfy timeliness constraints. As an example, somebody using a telephone, computer, or other interactive computing device would be intolerant of off times of hours or even minutes, because users are accustomed to devices making progress at sub-second intervals. Thus, off times are constrained to some maximum off time, which may be stored in a configuration storage of the system. In a given platform including a processor as described herein, each of many different system components may have a maximum off time associated with it. This maximum off time for each component is the longest off time that is acceptable for the responsiveness requirements of the given component. In an embodiment, the smallest of all such maximum off times may be designated as the maximum off time for the platform. Note that this maximum off time may change as components are added into and removed from a platform or as workloads change. For example, a time-sensitive component may be not in-use, in which case it does not contribute to the maximum off time, or the off time could be reduced when playing a game but increased for simple text typing, or increased further when the device is mostly idle.

Embodiments may implement ON-OFF keying using a fixed off time corresponding to this maximum off time. As such, based on a requested speed, the on time can be dynamically computed, resulting in a variable on time (and cycle time) and a fixed off time. Note that this requested speed, which may be requested by a given component of a system such as hardware, software or firmware, may be expressed as a percentage value of a particular operating frequency of a processor. In one such embodiment, this particular operating frequency may correspond to the minimum frequency, Fmin, which may be a lowest operating frequency in an active state, and in some embodiments may be a most efficient frequency in terms of power consumption. This is in contrast with fixed cycle time ON-OFF keying, in which the processor only runs at peak efficiency at a single speed, and at every other speed it would run at reduced efficiency. This is so, since over some time interval more than the minimum number of ON-OFF transitions occur, which in turn causes more than the minimum on/off overhead.

With a fixed cycle time control, a total on/off cycle time is selected such that the slowest speed does not violate the maximum off time. For example, if the maximum off time is 9 milliseconds (ms) and the lowest speed is 10%, the cycle time is 10 milliseconds. The 10% speed uses on=1 ms/off=9 ms; 20% speed uses on=2 ms/off=8 ms; and so on. However, using a fixed cycle time means the circuit only runs at peak efficiency at the 10% speed, and at every other speed runs at reduced efficiency because over some time interval it makes more than the minimum number of on/off transitions; in turn, it thus has more than the minimum on/off overhead. For example, at 30% speed with on=3 ms/off=7 ms, in 1000 ms of operation there will be 100 on/off transitions. However, 30% speed can also be achieved using on=3.86 ms/off=9 ms, gives the same 30% on time, but in 1000 ms there are 78 on/off transitions, which reduces overhead by more than 20%.

Using an embodiment, overhead of on and off transitions may always be minimized. At speeds at or very near the minimum speed, fixed cycle time and fixed (maximum) off time approaches have nearly the same off time, and thus have nearly the same efficiency. At low speeds near but not very near the minimum speed, a fixed cycle time approach may already have 10% more overhead than an embodiment using a fixed maximum OFF time. At speeds near the maximum speed, the fixed cycle approach makes many on/off transitions and has significant overhead, while a fixed off time approach nearly eliminates on/off transitions and thus has almost no overhead.

The usual alternative to ON-OFF keying is frequency-only scaling, which has poor efficiency at low speeds, with efficiency increasing with speed and having almost no overhead at high speeds. Such control loses significant efficiency away from the maximum speed. Even while ON-OFF keying with a fixed cycle time is efficient at low speeds, at medium speeds the overheads of such control may require a switch to frequency scaling. In contrast, embodiments enable ON-OFF keying to be more efficient than a fixed cycle ON-OFF keying approach or frequency scaling across a wide range of operating conditions.

Table 1 compares a fixed cycle approach and a fixed off time (and variable cycle time) approach in accordance with an embodiment in an example system, where the effective speed varies between 10% and 90%. "Fixed cycle" is 100 everywhere, meaning 100%, thus showing overhead normalized to a fixed cycle time approach.

TABLE 1

| Speed | 10% | 20% | 30% | 40% | 50% | 60% | 70% | 80% | 90% |
|---|---|---|---|---|---|---|---|---|---|
| Fixed Cycle | 100 | 100 | 100 | 100 | 100 | 100 | 100 | 100 | 100 |
| Fixed Off Time | 100 | 89 | 78 | 67 | 56 | 44 | 33 | 22 | 11 |
| Overhead Reduction | 0% | 11% | 22% | 33% | 44% | 56% | 67% | 78% | 89% |

At 10% speed and with a maximum off time of 9 ms, both the fixed cycle and variable cycle approaches operate with on=1 ms/off=9 ms. As the speed goes up, the fixed cycle approach varies the on and off times to maintain a fixed 10 ms cycle time. In contrast, the variable cycle approach maintains an off time of 9 ms and gradually increases the on time and the cycle time to reach the indicated speed. At 90% speed, an embodiment reduces overhead to just 11% of the overhead of the fixed cycle approach. Understand that other values may occur in other systems.

Some ON-OFF keying designs have overheads related to on time. For example, if a cache is turned off during the off time, then the cache state is to be reloaded during the on time. State reload may be handled automatically by cache hardware, but the overhead depends upon the on time. For example, when execution first resumes, the cache is empty and thus incurs a burst of cache misses; as execution proceeds, more and more of the working set is present in the cache; and after some time, all state lost during power-off will have been reloaded. These cache misses are overhead induced by ON-OFF keying (would not have occurred without ON-OFF keying), and may be accounted as part of the ON-OFF keying overhead.

FIG. 3B illustrates a fixed cycle time control, where for a desired ratio ON/(ON+OFF) the on and off times are varied so ON+OFF=(fixed cycle). FIG. 3C illustrates an embodiment having a fixed OFF time, where the on time is adjusted such that it maintains the desired ON/(ON+OFF) ratio. As shown in FIGS. 3B and 3C, each cycle is formed of an off time ($t_{off}$) and an on time. The difference between the cycles in FIGS. 3B and 3C is that in FIG. 3B the off time is less than a maximum off time (namely a maximum off time ($t_{off,max}$)) for a platform including a processor, and in FIG. 3C the off time corresponds to the maximum off time.

Figure 3D:
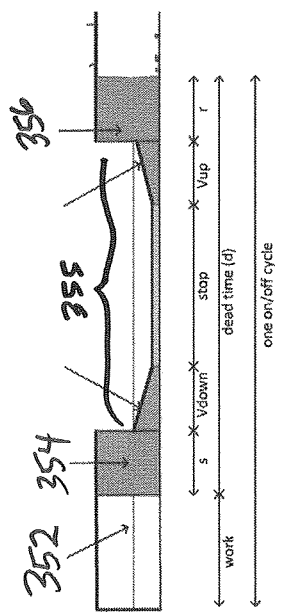
FIG. 3D is a graphical illustration of power consumption of a processor in accordance with an embodiment of the present invention.

Note that there is some overhead or waste associated with switching from on to off and from off to on. FIG. 3D shows one ON+OFF cycle, with time along the X/horizontal axis and power along the Y/vertical axis. Block 352 is a time duration in which the processor is on, doing useful work. Blocks 354 and 356 labeled "s" and "r" do not contribute to useful work, but consume power and thus is waste. Block 355 ("Vdown", "stop", and "Vup") uses some power but not much (and in some ON-OFF keying configurations use no power). The total "s+Vdown+stop+Vup+r" (which is labeled "dead time (d))" is one off time.

According to an embodiment, the advantage of maximizing the off time is that it minimizes the number of ON-to-OFF and OFF-to-ON transitions in any given time period (e.g., a millisecond, a second, or so forth) and thus minimizes the number of wasteful transitions. Since each transition has some waste, minimizing the number of transitions minimizes the waste.

When on time is short, the system is switched off before the cache state is fully reloaded. Thus, for short on time, the overhead is less than for long on time. The overheads are also large enough they typically cannot be ignored, as they may significantly affect the final result. The nature of the calculation depends on the cost being considered and may be an exact solution or an approximation. However, for both costs that are independent of on time and costs that depend on time, the same general observation applies: to maximize efficiency, always turn off for the maximum time, $T_{off,max}$.

In a given system there may be time quantization effects that dictate use of rounding. For example, if time quanta are in 1/10 ms units, then a given system may not be able to use the 3.86 ms quantum exactly. There are at least three approaches that can be used to realize reduced overheads in accordance with an embodiment of the present invention. First, the processor may be controlled to operate at a slightly different speed than requested, e.g., too fast or too slow, depending on the application. For example, on=3.8 ms/off=9 ms gives an effective speed of 29.7% and on=3.9 ms/off=9 ms gives an effective speed of 30.2%, both about 1% error from the requested speed. Second, the processor may be controlled to vary off time to match the desired speed, but operating at close to the maximum off time will still give close to the maximum efficiency. For example, on=3.8 ms/off=8.9 ms has very nearly the maximum off time and so very near the maximum efficiency; and it gives a requested speed of 29.92%, an error under 0.3% from the requested speed. Thus in some examples, the processor may be controlled to operate with an off time that corresponds to or is substantially close to the maximum off time. A third option is to control the processor to cycle on times between "too short" and "too long". For example, time can be switched between 3.8 ms and 3.9 ms to achieve the desired average speed.

Figure 4:
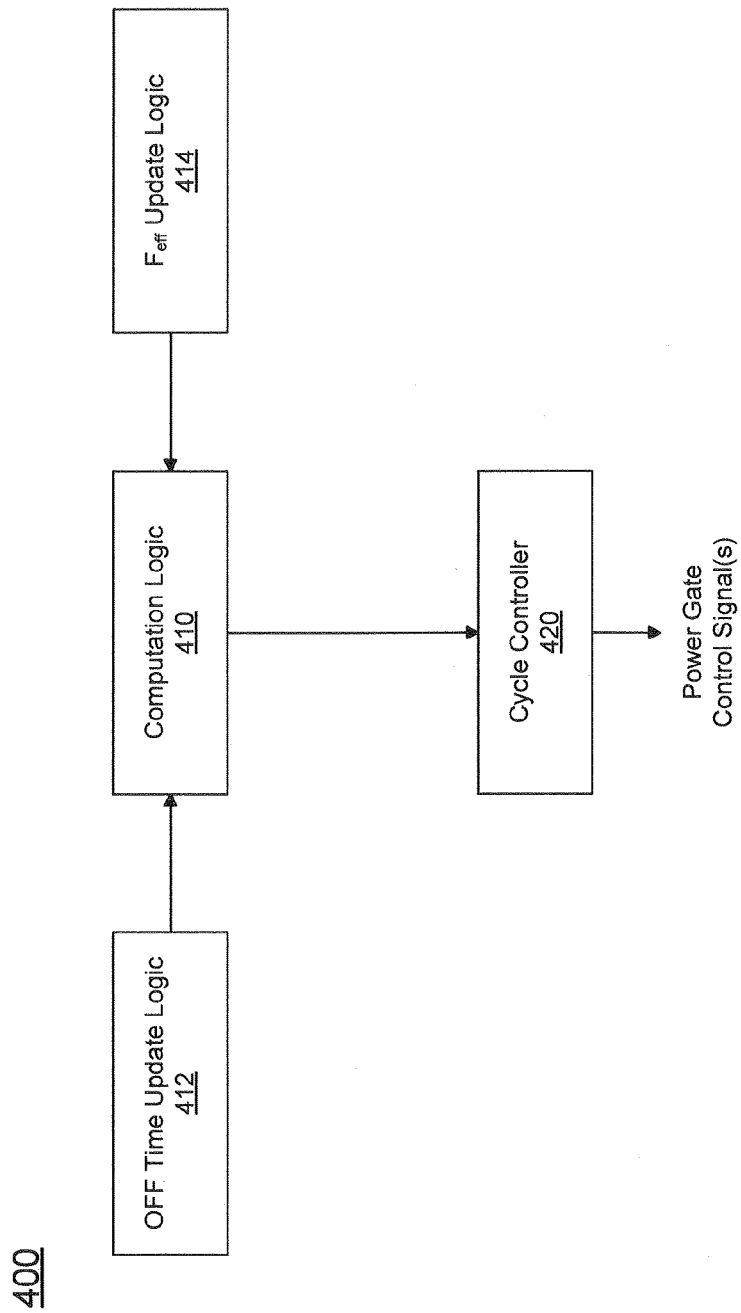
FIG. 4 is a block diagram of a power cycle logic in accordance with an embodiment of the present invention.

Referring now to FIG. 4, shown is a block diagram of a power cycle logic 400 in accordance with an embodiment of the present invention. Logic 400 may be implemented in various locations within a processor. In one embodiment, logic 400 may be dedicated logic within the processor including hardware configured to perform power control using ON-OFF keying. In another embodiment, logic 400 may be implemented within a power control unit (PCU) or other microcontroller of a processor. Still further, embodiments may be implemented within a processor core itself.

As seen in FIG. 4, logic 400 includes a computation logic 410. Computation logic 410 is configured to compute an on time value, in an embodiment. This on time value may be computed based on information received from an off time update logic 412 and an effective frequency update logic 414. In other embodiments, a single update logic may be present to provide updated parameters to computation logic 410. More specifically, in one embodiment the effective frequency corresponds to the speed as described herein. In various implementations this effective frequency may be enumerated as a percentage value, namely as a percentage of a maximum efficient frequency. In turn this maximum efficient frequency in an embodiment may correspond to a minimum frequency at which the processor operates in an active state (e.g., $F_{min}$). Computation logic 410 in an embodiment may be configured to compute $T_{on}$ using the maximum off time value received from off time update logic 412 and the requested speed received from effective frequency update logic 414. More specifically, in an embodiment the requested speed corresponds to:

$$\text{speed} = t_{on}/(t_{on}+t_{off,max}) \qquad [\text{EQ. 1}]$$

Then, computation logic 410 may calculate the on time according to the following Equation 2:

$$t_{on} = (\text{speed}*t_{off,max})/(1-\text{speed}) \qquad [\text{EQ. 2}]$$

As further seen in FIG. 4, computation logic 410 is coupled to a cycle controller 420 which may perform power control in accordance with an embodiment of the present invention. More specifically, cycle controller 420 may be configured to communicate control signals to power gates associated with one or more processing units to be cycled on and off according to an ON-OFF keying technique as described herein. Although the scope of the present invention is not limited in this regard, in an embodiment cycle controller 420 may include or may be associated with one or more timers. These timers may be configured as up count or down count counters in some embodiments. In an implementation with two counters, a first timer may be set for the on time and a second timer may be set for the off time such that as a given timer times out, a resulting power control signal sent to one or more power gates is set (or reset). In another embodiment, a single timer may be provided which can be serially loaded with a value for the on time and a value for the off time such that when the timer times out, a resulting power control signal sent to one or more power gates is set (or reset).

As further shown in FIG. 4, logic 400 further includes off time update logic 412. In an embodiment, logic 412 is configured to receive an update request for the on time. Such request may be received on system initialization, and optionally whenever a configuration update is made within a platform including the processor. For example, assume that a new device having a particular responsiveness requirement is connected into a system (e.g., a capture device or other device adapted into a platform such as via a USB cable). In an embodiment, upon any such platform reconfiguration, the new device may provide or may be requested to provide a responsiveness requirement which in an embodiment may be communicated, e.g., in units of microseconds.

In turn, effective frequency update logic 410 is configured to receive a request to update the effective frequency or speed. Such request may be received from various platform entities including software entities such as an OS or BIOS. For example in an implementation of a portable computing device such as a smartphone, triggering of a thermal sensor may cause system software to request that the effective frequency or speed be reduced to thus reduce power consumption, in turn reducing the thermal output. Such actions may occur when a smartphone is configured to not exceed a given temperature, as the phone may be carried within a user's pocket. Note that although shown at this high level in the embodiment of FIG. 4, understand the scope of the present invention is not limited in this regard.

Figure 5:
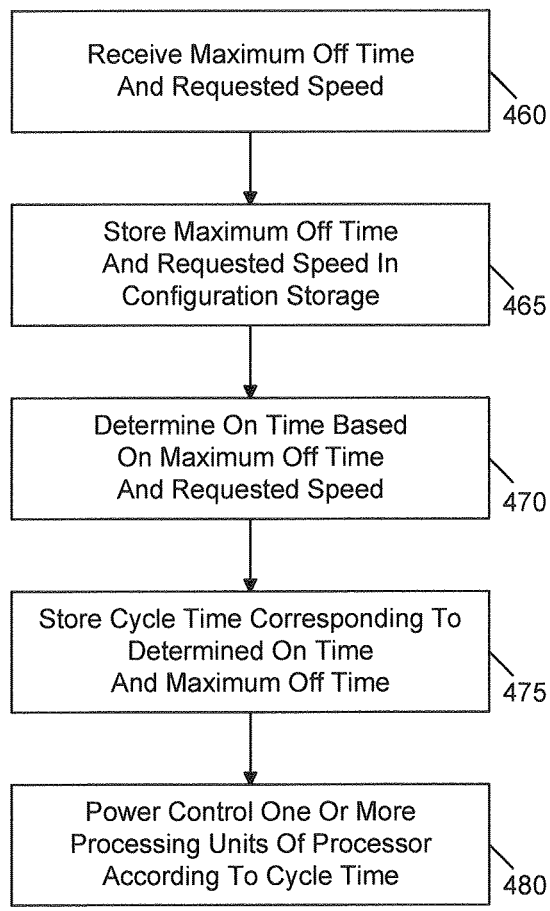
FIG. 5 is a flow diagram of a method for performing power control according to an ON-OFF keying technique in accordance with an embodiment of the present invention.

Referring now to FIG. 5, shown is a flow diagram of a method for performing power control according to an ON-OFF keying technique in accordance with an embodiment of the present invention. Method 450 may be performed by power control logic such as logic 400 of FIG. 4 or other processing logic within a processor.

As seen, method 450 begins by receiving a maximum off time value and a requested speed value (block 460). As discussed above, these inputs may be received from various platform entities. At block 465 these values may be stored in a configuration storage. For example, in an embodiment implemented within a PCU, these values may be stored in one or more configuration registers of the PCU. Still referring to FIG. 5, control next passes to block 470 where an on time value can be determined based on the maximum off time and the requested speed. In an embodiment, this on time value can be calculated according to Equation 2 above. Note that in certain situations, variations to the calculation of the on time (and possible modification to the off time) are possible, as described above. Next at block 475 a cycle time may be stored. More specifically, this cycle time may be formed of the on time value and the maximum off time value. As above, these values may be stored in an appropriate configuration storage or another destination storage.

Finally, at block 480 power control may be performed. More specifically, one or more processing units of a processor can be power controlled according to the cycle time. For example, a given core may be power controlled according to an ON-OFF keying technique in which the off time corresponds to the maximum off time for the platform and the on time is adjusted according to a given requested speed, as described herein. This maximum off time may be an off time associated with a platform component having the shortest responsiveness requirement.

Rather than control of a given one or more cores according to power gating, particular units of a processor such as particular functional or execution units may be power controlled in this same ON-OFF keying manner. Furthermore, understand that even during the off times, certain logic and storage components of a processor may remain powered, at least with a retention voltage such that values stored in these structures remain valid. As such, reduced overhead is realized on resumption of processing activities during the on time.

Note also that the ON-OFF keying that is performed according to an embodiment of the present invention occurs when a processor is in an active (e.g., C0) state. That is, the ON-OFF keying is done within a single active state of the processor. The processor can be controlled according to more coarsely grained mechanisms such as an ACPI technique so that the processor itself enters into and exits from low power (e.g., C1-Cn) states according to ACPI handling. Yet during a single C0 or active state interval, potentially many individual on times and off times occur according to ON-OFF keying in accordance with an embodiment of the present invention.

Embodiments thus vary cycle time with the effective speed, maintaining the off time constant (and set to a maximum off time in many embodiments). Using an embodiment, energy and power consumption may be reduced at low operating voltage and execution speed. Such techniques are generally applicable to power management of processors and other integrated circuits incorporated into many different platform types including mobile, desktop/server, and graphics systems.

Figure 6:
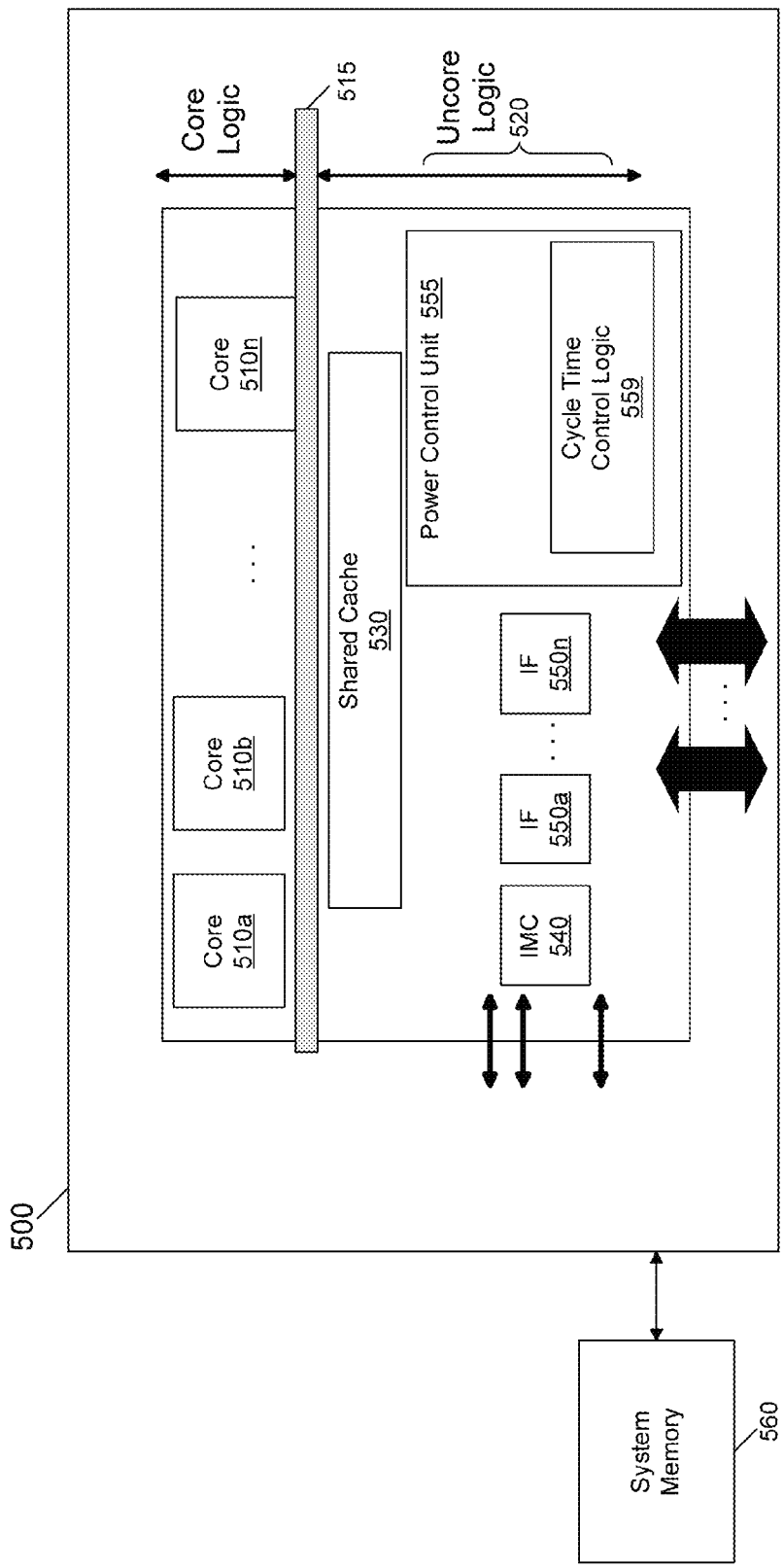
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 500 may be a multicore processor including a plurality of cores 510$a$-510$n$. In one embodiment, each such core may be of an independent power domain and can be configured to enter and exit active states and/or turbo modes based on workload. The various cores may be coupled via an interconnect 515 to a system agent or uncore 520 that includes various components. As seen, the uncore 520 may include a shared cache 530 which may be a last level cache. In addition, the uncore may include an integrated memory controller 540, various interfaces 550 and a power control unit 555.

In various embodiments, power control unit 555 may include a cycle time control logic 559 in accordance with an embodiment of the present invention. As described above, this logic is configured to dynamically determine a cycle time for implementation of ON-OFF keying power control logic to maintain the off time at or substantially at a maximum off time for the system, thus reducing overhead of the power control as much as possible.

With further reference to FIG. 6, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 6, the scope of the present invention is not limited in this regard.

Figure 7:
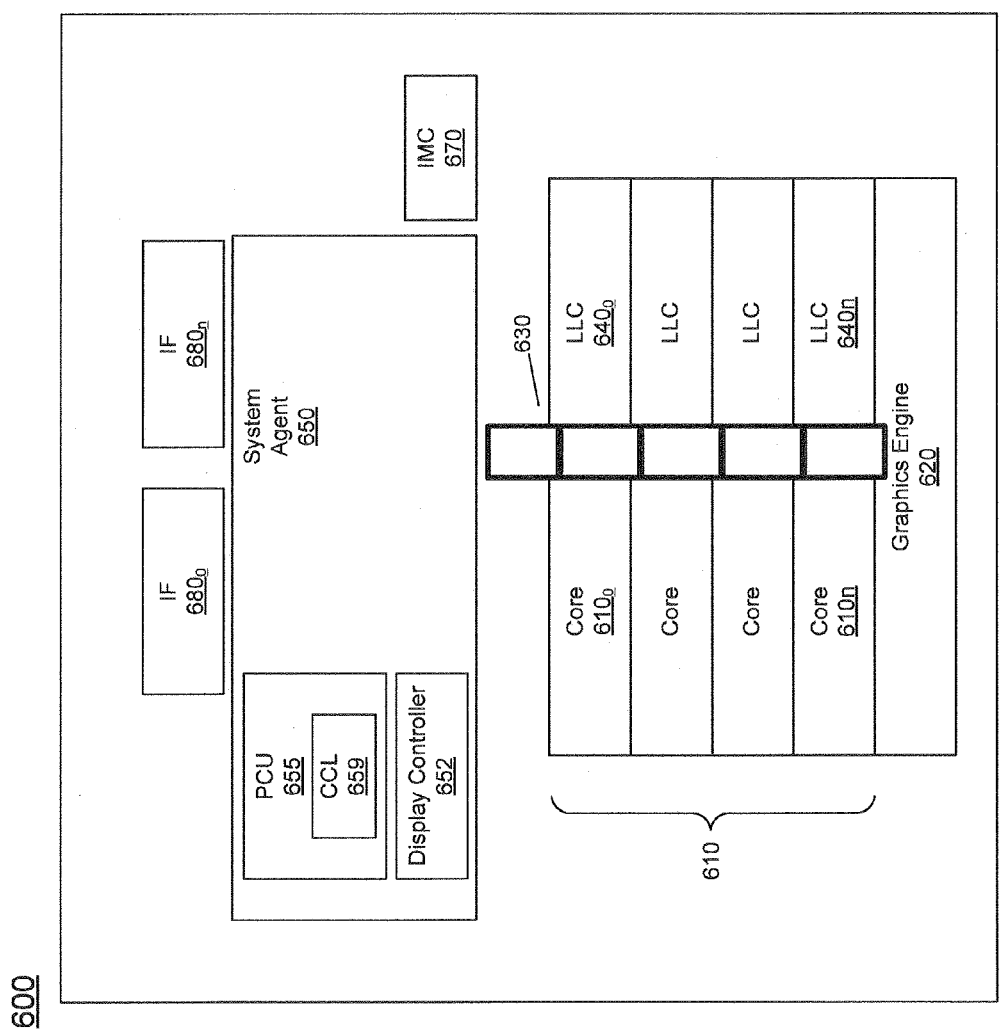
FIG. 7 is a block diagram of a multi-domain processor in accordance with an embodiment of the present invention.

Referring now to FIG. 7, shown is a block diagram of a multi-domain processor in accordance with another embodiment of the present invention. As shown in the embodiment of FIG. 7, processor 600 includes multiple domains. Specifically, a core domain 610 can include a plurality of cores 610$_0$-610$_n$, a graphics domain 620 can include one or more graphics engines, and a system agent domain 650 may further be present. In some embodiments, system agent domain 650 may execute at an independent frequency than the core domain and may remain powered on at all times to handle power control events and power management such that domains 610 and 620 can be controlled to dynamically enter into and exit high power and low power states. Each of domains 610 and 620 may operate at different voltage and/or power. Note that while only shown with three domains, understand the scope of the present invention is not limited in this regard and additional domains can be present in other embodiments. For example, multiple core domains may be present each including at least one core.

In general, each core 610 may further include low level caches in addition to various execution units and additional processing elements. In turn, the various cores may be coupled to each other and to a shared cache memory formed of a plurality of units of a last level cache (LLC) 640$_0$-640$_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650. In one embodiment, interconnect 630 can be part of the core domain. However in other embodiments the ring interconnect can be of its own domain.

As further seen, system agent domain 650 may include display controller 652 which may provide control of and an interface to an associated display. As further seen, system agent domain 650 may include a power control unit 655 which can include a cycle control logic 659 in accordance with an embodiment of the present invention to enable configurable dynamic control of the cycle time for performing ON-OFF keying power control during an active state of one or more cores as described herein. In various embodiments, this logic may be configured as in FIG. 4 and may execute the algorithm described above in FIG. 5.

As further seen in FIG. 7, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
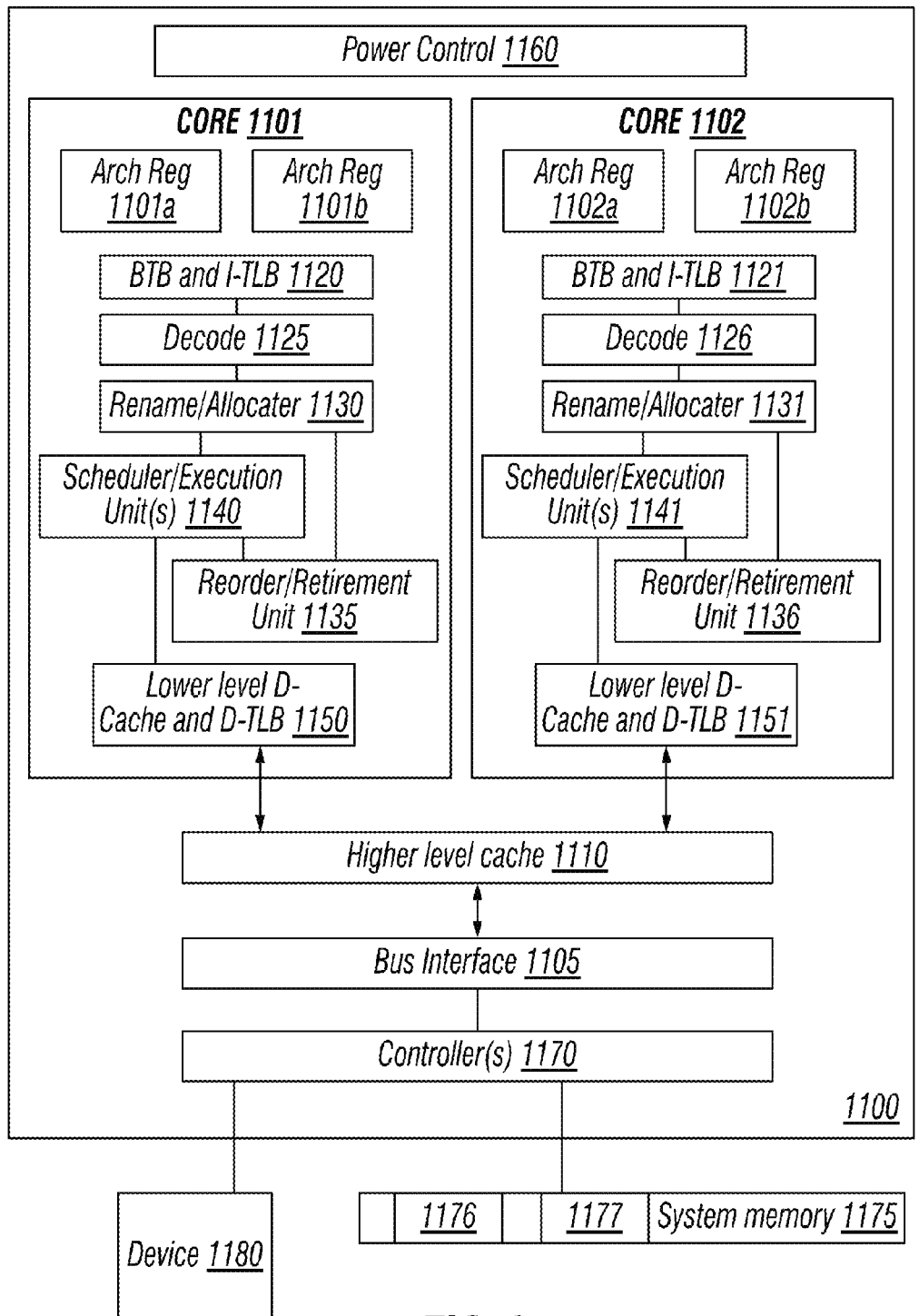
FIG. 8 is a block diagram of a processor including multiple cores in accordance with an embodiment of the present invention.

Referring to FIG. 8, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 8, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 9:
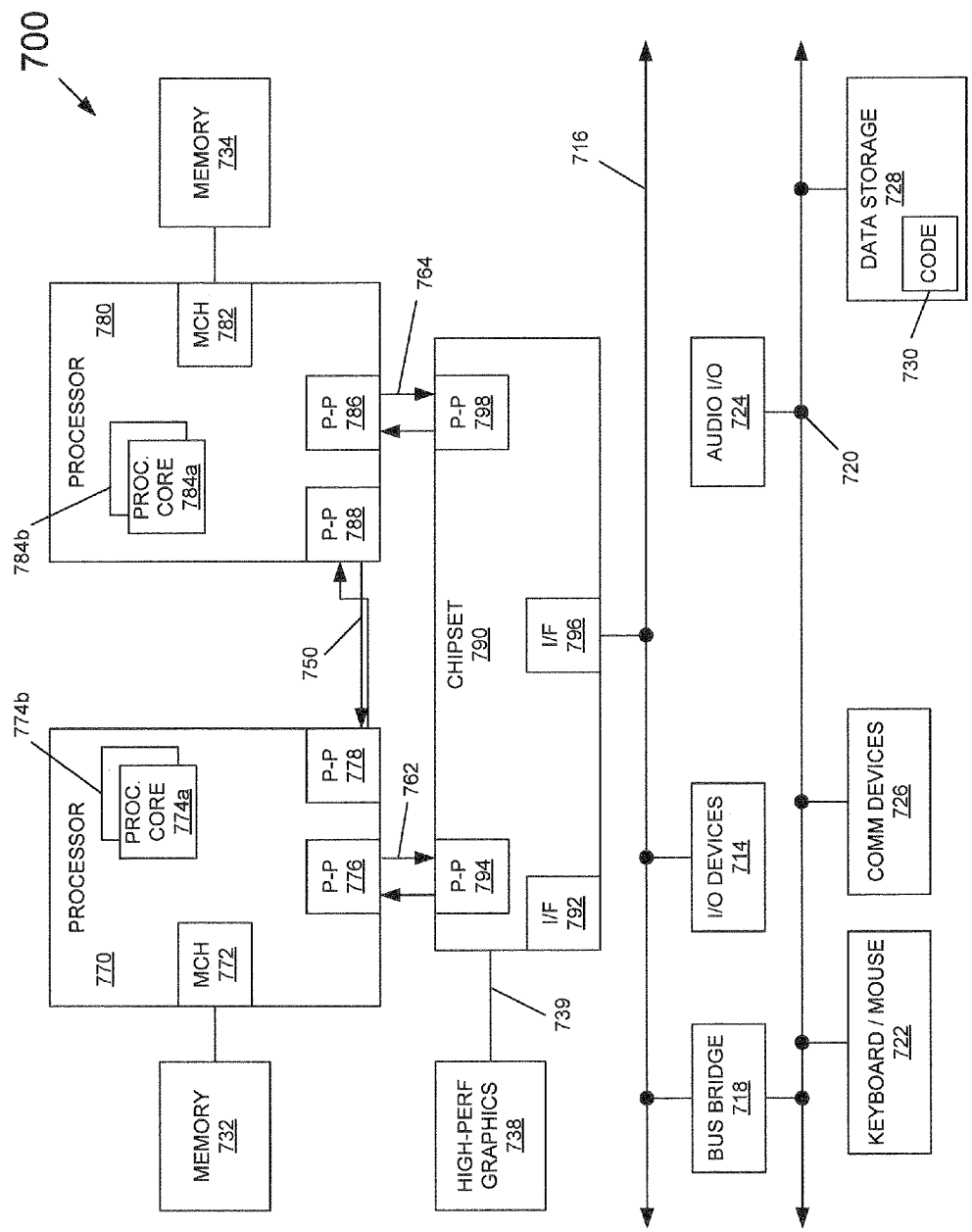
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 700 is a point-to-point interconnect system, and includes a first processor 770 and a second processor 780 coupled via a point-to-point interconnect 750. As shown in FIG. 9, each of processors 770 and 780 may be multicore processors, including first and second processor cores (i.e., processor cores 774a and 774b and processor cores 784a and 784b), although potentially many more cores may be present in the processors. Each of the processors can include a PCU or other logic to perform ON-OFF keying cycle control to maintain a fixed maximum off time (or substantially maximum off time), as described herein.

Still referring to FIG. 9, first processor 770 further includes a memory controller hub (MCH) 672 and point-to-point (P-P) interfaces 776 and 778. Similarly, second processor 780 includes a MCH 782 and P-P interfaces 786 and 788. As shown in FIG. 9, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 9, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 9, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

The following examples pertain to further embodiments.

In one example, an apparatus comprises a plurality of circuits to independently operate, and a first logic coupled to the plurality of circuits to cause at least one of the plurality of circuits to operate with a power control cycle including a plurality of on times and a plurality of off times according to an ON-OFF keying protocol, the plurality of off times each corresponding to a maximum off time for a platform including the apparatus.

In an example, the first logic is to dynamically calculate an on time for the plurality of on times based on a requested speed.

In an example, the ON-OFF keying protocol has a controllable cycle time based at least in part on the dynamically calculated on time and the requested speed.

In an example, the first logic is to increase the on time of the plurality of on times responsive to a request to increase the requested speed.

In an example, the first logic is to reduce the off time to a value substantially close to the maximum off time for at least some of the plurality of off times to maintain a speed of the apparatus substantially close to the requested speed.

In an example, the first logic is to set the on time for a first portion of the plurality of on times to a first value and to set the on time for a second portion of the plurality of on times to a second value, to maintain the requested speed.

In an example, the first logic comprises a first timer associated with the dynamically calculated on time, a second timer associated with the maximum off time, and a cycle controller to issue at least one power gate signal responsive to a value of at least one of the first and second timers.

In an example, a configuration storage is to store the maximum off time, wherein the configuration register is to be updated responsive to reconfiguration of the platform to include a new hardware device.

In an example, the first logic is to issue at least one power gate control signal to cause one or more switches to control an ON condition and an OFF condition for one or more of the plurality of circuits of the apparatus.

In an example, the apparatus comprises a processor that includes a PCU including the first logic, wherein the PCU is to select ON-OFF keying for a Vmin condition of the processor and to select a voltage-frequency scaling for a voltage condition of the processor greater than the Vmin.

In another example, a processor comprises a computation logic to receive a requested speed for the processor and a maximum off time for a platform including the processor and to calculate an on time based on the requested speed and the maximum off time, and a cycle controller to issue at least one power control signal according to a power control cycle including a plurality of on times and a plurality of off times according to an ON-OFF keying protocol, the plurality of off times each corresponding at least substantially to the maximum off time.

In an example, the computation logic is to control a cycle time based at least in part on the dynamically calculated on time and the requested speed.

In an example, the computation logic is to reduce the off time to a value substantially close to the maximum off time for at least some of the plurality of off times to maintain a speed of the processor substantially close to the requested speed.

In an example, the computation logic is to set the on time for a first portion of the plurality of on times to a first value and to set the on time for a second portion of the plurality of on times to a second value, to maintain the requested speed.

In an example, the processor is a multicore processor including a plurality of cores and a PCU including the computation logic and the cycle controller.

In an example, the processor further comprises an update logic to receive an update to the requested speed and an update to the maximum off time for the platform when a new device is inserted into the platform.

Note that the above processor can be implemented using various means.

In an example, the processor comprises a SoC incorporated in a user equipment touch-enabled device.

In another example, a system comprises a display and a memory, and includes the processor of one or more of the above examples.

In another example, an apparatus comprises a plurality of circuits to independently operate, and a first means for causing at least one of the plurality of circuits to operate with a power control cycle including a plurality of on times and a plurality of off times according to an ON-OFF keying protocol, the plurality of off times each corresponding to a maximum off time for a platform including the apparatus.

In another example, a method comprises receiving a maximum off time for a system including a processor and a requested speed for the processor, determining an on time based on the maximum off time and the requested speed, and power controlling one or more processing units of the processor according to a cycle time formed of the on time and the maximum off time.

In an example, power controlling the one or more processing units comprises maintaining the on time to be a first value for a first portion of a plurality of cycles each formed of the cycle time and maintaining the on time to be a second value for a second portion of the plurality of cycles, to maintain the requested speed.

In an example, power controlling the one or more processing units further comprises issuing a power gate signal to one or more power gates of the processor, the power gates active to gate power during the maximum off time.

In an example, the method further comprises power controlling the one or more processing units according to ON-OFF keying for a minimum voltage condition (Vmin) of the processor and power controlling the one or more processing units according to a voltage-frequency scaling for a voltage condition of the processor greater than the Vmin.

In an example, at least one machine readable medium comprises a plurality of instructions that in response to being executed on a computing device, cause the computing device to carry out a method according to any one of any of the above examples.

In another example, a computer readable medium including instructions is to perform the method of any of the above examples.

In another example, an apparatus comprises means for performing the method of any one of the above examples.

In another example, a processor comprises a computation means for receiving a requested speed for the processor and a maximum off time for a platform including the processor and for calculating an on time based on the requested speed and the maximum off time, and a cycle controller to issue at least one power control signal according to a power control cycle including a plurality of on times and a plurality of off times according to an ON-OFF keying protocol, the plurality of off times each corresponding at least substantially to the maximum off time.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of circuits to independently operate;
   a first logic coupled to the plurality of circuits to cause at least one of the plurality of circuits to operate with a power control cycle including a plurality of on times and a plurality of off times according to an ON-OFF keying protocol, the plurality of off times each corresponding to a maximum off time for a platform including the processor; and
   a configuration storage to store the maximum off time, wherein the configuration storage is to be updated responsive to reconfiguration of the platform to include a new hardware device.

2. The processor of claim 1, wherein the first logic is to dynamically calculate an on time for the plurality of on times based on a requested speed.

3. The processor of claim 2, wherein the ON-OFF keying protocol has a controllable cycle time based at least in part on the dynamically calculated on time and the requested speed.

4. The processor of claim 2, wherein the first logic is to increase the on time of the plurality of on times responsive to a request to increase the requested speed.

5. The processor of claim 2, wherein the first logic is to reduce the off time to a value substantially close to the maximum off time for at least some of the plurality of off times to maintain a speed of the processor substantially close to the requested speed.

6. The processor of claim 2, wherein the first logic is to set the on time for a first portion of the plurality of on times to a first value and to set the on time for a second portion of the plurality of on times to a second value, to maintain the requested speed.

7. The processor of claim 2, wherein the first logic comprises:
   a first timer associated with the dynamically calculated on time;
   a second timer associated with the maximum off time; and
   a cycle controller to issue at least one power gate signal responsive to a value of at least one of the first and second timers.

8. The processor of claim 1, wherein the first logic is to issue at least one power gate control signal to cause one or more switches to control an ON condition and an OFF condition for one or more of the plurality of circuits of the processor.

9. The processor of claim 1, wherein the processor further comprises a power control unit (PCU) including the first logic, wherein the PCU is to select ON-OFF keying for a minimum voltage condition (Vmin) of the processor and to select a voltage-frequency scaling for a voltage condition of the processor greater than the Vmin.

10. A non-transitory machine-readable medium having stored thereon instructions, which if performed by a machine cause the machine to perform a method comprising:
   receiving a maximum off time for a system including a processor and a requested speed for the processor;
   determining an on time based on the maximum off time and the requested speed; and
   power controlling one or more processing units of the processor according to a cycle time formed of the on time and the maximum off time, wherein the maximum off time is to be updated responsive to insertion of a new device into the system.

11. The non-transitory machine-readable medium of claim 10, wherein power controlling the one or more processing units comprises maintaining the on time to be a first value for a first portion of a plurality of cycles each formed of the cycle time and maintaining the on time to be a second value for a second portion of the plurality of cycles, to maintain the requested speed.

12. The non-transitory machine-readable medium of claim 10, wherein power controlling the one or more processing units further comprises issuing a power gate signal to one or more power gates of the processor, the power gates active to gate power during the maximum off time.

13. The non-transitory machine-readable medium of claim 10, wherein the method further comprises power controlling the one or more processing units according to ON-OFF keying for a minimum voltage condition (Vmin) of the processor and power controlling the one or more processing units according to a voltage-frequency scaling for a voltage condition of the processor greater than the Vmin.

14. A processor comprising:
   a multicore processor including a plurality of cores and a power control unit (PCU), the PCU including:

a computation logic to receive a requested speed for the processor and a maximum off time for a platform including the processor and to calculate an on time based on the requested speed and the maximum off time;

a cycle controller to issue at least one power control signal according to a power control cycle including a plurality of on times and a plurality of off times according to an ON-OFF keying protocol, the plurality of off times each corresponding at least substantially to the maximum off time; and an update logic to receive an update to the requested speed and an update to the maximum off time for the platform when a new device is inserted into the platform.

15. The processor of claim 14, wherein the computation logic is to control a cycle time based at least in part on the dynamically calculated on time and the requested speed.

16. The processor of claim 14, wherein the computation logic is to reduce the off time to a value substantially close to the maximum off time for at least some of the plurality of off times to maintain a speed of the processor substantially close to the requested speed.

17. The processor of claim 14, wherein the computation logic is to set the on time for a first portion of the plurality of on times to a first value and to set the on time for a second portion of the plurality of on times to a second value, to maintain the requested speed.

* * * * *